United States Patent
Tripathy et al.

(10) Patent No.: US 9,824,711 B1
(45) Date of Patent: Nov. 21, 2017

(54) SOFT UNDERLAYER FOR HEAT ASSISTED MAGNETIC RECORDING MEDIA

(71) Applicant: WD Media, LLC, San Jose, CA (US)

(72) Inventors: Debashish Tripathy, San Jose, CA (US); Antony Ajan, San Jose, CA (US); Tomoko Seki, Sunnyvale, CA (US); Gerardo A. Bertero, Redwood City, CA (US)

(73) Assignee: WD Media, LLC, San Jose, CA (US)

( * ) Notice: Subject to any disclaimer, the term of this patent is extended or adjusted under 35 U.S.C. 154(b) by 49 days.

(21) Appl. No.: 14/315,101

(22) Filed: Jun. 25, 2014

Related U.S. Application Data

(60) Provisional application No. 61/939,800, filed on Feb. 14, 2014.

(51) Int. Cl.
*G11B 5/66* (2006.01)
*G11B 5/738* (2006.01)
*G11B 5/84* (2006.01)

(52) U.S. Cl.
CPC ............... *G11B 5/738* (2013.01); *G11B 5/84* (2013.01)

(58) Field of Classification Search
CPC ........... G11B 5/667; G11B 5/66; G11B 5/656; G11B 5/653; G11B 5/65; G11B 2005/0021
See application file for complete search history.

(56) References Cited

U.S. PATENT DOCUMENTS

| | | | |
|---|---|---|---|
| 6,013,161 A | 1/2000 | Chen et al. | |
| 6,063,248 A | 5/2000 | Bourez et al. | |
| 6,068,891 A | 5/2000 | O'Dell et al. | |
| 6,086,730 A | 7/2000 | Liu et al. | |
| 6,099,981 A | 8/2000 | Nishimori | |
| 6,103,404 A | 8/2000 | Ross et al. | |
| 6,117,499 A | 9/2000 | Wong et al. | |
| 6,136,403 A | 10/2000 | Prabhakara et al. | |
| 6,143,375 A | 11/2000 | Ross et al. | |

(Continued)

FOREIGN PATENT DOCUMENTS

CN  101882445  11/2010

OTHER PUBLICATIONS

English abstract of JP 2010-055691, Japan, Mar. 11, 2010.*

(Continued)

*Primary Examiner* — Holly Rickman
(74) *Attorney, Agent, or Firm* — Foley & Lardner LLP

(57) ABSTRACT

A soft underlayer (SUL) and methods for making an SUL are provided, the SUL having characteristics that make it compatible with the high temperature requirements associated with heat-assisted magnetic recording (HAMR) media growth and writing, e.g., temperatures greater than 500° C. The SUL may have a high crystallization temperature of greater than 450° C. and a high Curie temperature greater than 300° C., for example. Additionally, the SUL can maintain a saturation magnetization value greater than, e.g., 9 kGauss, at such high temperatures, thereby having the ability to remain amorphous at temperatures up to, e.g., 650° C., and exhibiting a relatively flat integrated noise profile from approximately 300° C. to 650° C. Further still, a spacer layer material is chosen such that inter-diffusion does not occur at these high temperatures.

11 Claims, 11 Drawing Sheets

(56) References Cited

U.S. PATENT DOCUMENTS

| | | | |
|---|---|---|---|
| 6,145,849 A | 11/2000 | Bae et al. |
| 6,146,737 A | 11/2000 | Malhotra et al. |
| 6,149,696 A | 11/2000 | Jia |
| 6,150,015 A | 11/2000 | Bertero et al. |
| 6,156,404 A | 12/2000 | Ross et al. |
| 6,159,076 A | 12/2000 | Sun et al. |
| 6,164,118 A | 12/2000 | Suzuki et al. |
| 6,200,441 B1 | 3/2001 | Gornicki et al. |
| 6,204,995 B1 | 3/2001 | Hokkyo et al. |
| 6,206,765 B1 | 3/2001 | Sanders et al. |
| 6,210,819 B1 | 4/2001 | Lal et al. |
| 6,216,709 B1 | 4/2001 | Fung et al. |
| 6,221,119 B1 | 4/2001 | Homola |
| 6,248,395 B1 | 6/2001 | Homola et al. |
| 6,261,681 B1 | 7/2001 | Suekane et al. |
| 6,270,885 B1 | 8/2001 | Hokkyo et al. |
| 6,274,063 B1 | 8/2001 | Li et al. |
| 6,283,838 B1 | 9/2001 | Blake et al. |
| 6,287,429 B1 | 9/2001 | Moroishi et al. |
| 6,290,573 B1 | 9/2001 | Suzuki |
| 6,299,947 B1 | 10/2001 | Suzuki et al. |
| 6,303,217 B1 | 10/2001 | Malhotra et al. |
| 6,309,765 B1 | 10/2001 | Suekane et al. |
| 6,358,636 B1 | 3/2002 | Yang et al. |
| 6,362,452 B1 | 3/2002 | Suzuki et al. |
| 6,363,599 B1 | 4/2002 | Bajorek |
| 6,365,012 B1 | 4/2002 | Sato et al. |
| 6,381,090 B1 | 4/2002 | Suzuki et al. |
| 6,381,092 B1 | 4/2002 | Suzuki |
| 6,387,483 B1 | 5/2002 | Hokkyo et al. |
| 6,391,213 B1 | 5/2002 | Homola |
| 6,395,349 B1 | 5/2002 | Salamon |
| 6,403,919 B1 | 6/2002 | Salamon |
| 6,408,677 B1 | 6/2002 | Suzuki |
| 6,426,157 B1 | 7/2002 | Hokkyo et al. |
| 6,429,984 B1 | 8/2002 | Alex |
| 6,482,330 B1 | 11/2002 | Bajorek |
| 6,482,505 B1 | 11/2002 | Bertero et al. |
| 6,500,567 B1 | 12/2002 | Bertero et al. |
| 6,528,124 B1 | 3/2003 | Nguyen |
| 6,548,821 B1 | 4/2003 | Treves et al. |
| 6,552,871 B2 | 4/2003 | Suzuki et al. |
| 6,565,719 B1 | 5/2003 | Lairson et al. |
| 6,566,674 B1 | 5/2003 | Treves et al. |
| 6,571,806 B2 | 6/2003 | Rosano et al. |
| 6,628,466 B2 | 9/2003 | Alex |
| 6,664,503 B1 | 12/2003 | Hsieh et al. |
| 6,670,055 B2 | 12/2003 | Tomiyasu et al. |
| 6,682,807 B2 | 1/2004 | Lairson et al. |
| 6,683,754 B2 | 1/2004 | Suzuki et al. |
| 6,730,420 B1 | 5/2004 | Bertero et al. |
| 6,743,528 B2 | 6/2004 | Suekane et al. |
| 6,759,138 B2 | 7/2004 | Tomiyasu et al. |
| 6,778,353 B1 | 8/2004 | Harper |
| 6,795,274 B1 | 9/2004 | Hsieh et al. |
| 6,855,232 B2 | 2/2005 | Jairson et al. |
| 6,857,937 B2 | 2/2005 | Bajorek |
| 6,893,748 B2 | 5/2005 | Bertero et al. |
| 6,899,959 B2 | 5/2005 | Bertero et al. |
| 6,916,558 B2 | 7/2005 | Umezawa et al. |
| 6,939,120 B1 | 9/2005 | Harper |
| 6,946,191 B2 | 9/2005 | Morikawa et al. |
| 6,967,798 B2 | 11/2005 | Homola et al. |
| 6,972,135 B2 | 12/2005 | Homola |
| 7,004,827 B1 | 2/2006 | Suzuki et al. |
| 7,006,323 B1 | 2/2006 | Suzuki |
| 7,016,154 B2 | 3/2006 | Nishihira |
| 7,019,924 B2 | 3/2006 | McNeil et al. |
| 7,045,215 B2 | 5/2006 | Shimokawa |
| 7,070,870 B2 | 7/2006 | Bertero et al. |
| 7,090,934 B2 | 8/2006 | Hokkyo et al. |
| 7,099,112 B1 | 8/2006 | Harper |
| 7,105,241 B2 | 9/2006 | Shimokawa et al. |
| 7,119,990 B2 | 10/2006 | Bajorek et al. |
| 7,147,790 B2 | 12/2006 | Wachenschwanz et al. |
| 7,161,753 B2 | 1/2007 | Wachenschwanz et al. |
| 7,166,319 B2 | 1/2007 | Ishiyama |
| 7,166,374 B2 | 1/2007 | Suekane et al. |
| 7,169,487 B2 | 1/2007 | Kawai et al. |
| 7,174,775 B2 | 2/2007 | Ishiyama |
| 7,179,549 B2 | 2/2007 | Malhotra et al. |
| 7,184,139 B2 | 2/2007 | Treves et al. |
| 7,196,860 B2 | 3/2007 | Alex |
| 7,199,977 B2 | 4/2007 | Suzuki et al. |
| 7,208,236 B2 | 4/2007 | Morikawa et al. |
| 7,220,500 B1 | 5/2007 | Tomiyasu et al. |
| 7,229,266 B2 | 6/2007 | Harper |
| 7,239,970 B2 | 7/2007 | Treves et al. |
| 7,252,897 B2 | 8/2007 | Shimokawa et al. |
| 7,277,254 B2 | 10/2007 | Shimokawa et al. |
| 7,281,920 B2 | 10/2007 | Homola et al. |
| 7,292,329 B2 | 11/2007 | Treves et al. |
| 7,301,726 B1 | 11/2007 | Suzuki |
| 7,302,148 B2 | 11/2007 | Treves et al. |
| 7,305,119 B2 | 12/2007 | Treves et al. |
| 7,314,404 B2 | 1/2008 | Singh et al. |
| 7,320,584 B1 | 1/2008 | Harper et al. |
| 7,329,114 B2 | 2/2008 | Harper et al. |
| 7,375,362 B2 | 5/2008 | Treves et al. |
| 7,420,886 B2 | 9/2008 | Tomiyasu et al. |
| 7,425,719 B2 | 9/2008 | Treves et al. |
| 7,471,484 B2 | 12/2008 | Wachenschwanz et al. |
| 7,498,062 B2 | 3/2009 | Calcaterra et al. |
| 7,531,485 B2 | 5/2009 | Hara et al. |
| 7,537,846 B2 | 5/2009 | Ishiyama et al. |
| 7,549,209 B2 | 6/2009 | Wachenschwanz et al. |
| 7,569,490 B2 | 8/2009 | Staud |
| 7,597,792 B2 | 10/2009 | Homola et al. |
| 7,597,973 B2 | 10/2009 | Ishiyama |
| 7,608,193 B2 | 10/2009 | Wachenschwanz et al. |
| 7,632,087 B2 | 12/2009 | Homola |
| 7,656,615 B2 | 2/2010 | Wachenschwanz et al. |
| 7,682,546 B2 | 3/2010 | Harper |
| 7,684,152 B2 | 3/2010 | Suzuki et al. |
| 7,686,606 B2 | 3/2010 | Harper et al. |
| 7,686,991 B2 | 3/2010 | Harper |
| 7,695,833 B2 | 4/2010 | Ishiyama |
| 7,722,968 B2 | 5/2010 | Ishiyama |
| 7,733,605 B2 | 6/2010 | Suzuki et al. |
| 7,736,768 B2 | 6/2010 | Ishiyama |
| 7,755,861 B1 | 7/2010 | Li et al. |
| 7,758,732 B1 | 7/2010 | Calcaterra et al. |
| 7,833,639 B2 | 11/2010 | Sonobe et al. |
| 7,833,641 B2 | 11/2010 | Tomiyasu et al. |
| 7,901,802 B2 * | 3/2011 | Zhou ............... G11B 5/82 |
| | | | 428/828.1 |
| 7,910,159 B2 | 3/2011 | Jung |
| 7,911,736 B2 | 3/2011 | Bajorek |
| 7,924,519 B2 | 4/2011 | Lambert |
| 7,944,165 B1 | 5/2011 | O'Dell |
| 7,944,643 B1 | 5/2011 | Jiang et al. |
| 7,955,723 B2 | 6/2011 | Umezawa et al. |
| 7,964,297 B2 | 6/2011 | Deng et al. |
| 7,983,003 B2 | 7/2011 | Sonobe et al. |
| 7,993,497 B2 | 8/2011 | Moroishi et al. |
| 7,993,765 B2 | 8/2011 | Kim et al. |
| 7,998,912 B2 | 8/2011 | Chen et al. |
| 8,002,901 B1 | 8/2011 | Chen et al. |
| 8,003,237 B2 | 8/2011 | Sonobe et al. |
| 8,012,920 B2 | 9/2011 | Shimokawa |
| 8,038,863 B2 | 10/2011 | Homola |
| 8,057,926 B2 | 11/2011 | Ayama et al. |
| 8,062,778 B2 | 11/2011 | Suzuki et al. |
| 8,064,156 B1 | 11/2011 | Suzuki et al. |
| 8,076,013 B2 | 12/2011 | Sonobe et al. |
| 8,092,931 B2 | 1/2012 | Ishiyama et al. |
| 8,100,685 B1 | 1/2012 | Harper et al. |
| 8,101,054 B2 | 1/2012 | Chen et al. |
| 8,125,723 B1 | 2/2012 | Nichols et al. |
| 8,125,724 B1 | 2/2012 | Nichols et al. |
| 8,137,517 B1 | 3/2012 | Bourez |
| 8,142,916 B2 | 3/2012 | Umezawa et al. |
| 8,163,093 B1 | 4/2012 | Chen et al. |
| 8,171,949 B1 | 5/2012 | Lund et al. |

(56) References Cited

U.S. PATENT DOCUMENTS

| | | | |
|---|---|---|---|
| 8,173,282 B1* | 5/2012 | Sun | G11B 5/65 204/192.1 |
| 8,178,480 B2 | 5/2012 | Hamakubo et al. | |
| 8,206,789 B2 | 6/2012 | Suzuki | |
| 8,218,260 B2 | 7/2012 | Iamratanakul et al. | |
| 8,247,095 B2 | 8/2012 | Champion et al. | |
| 8,257,783 B2 | 9/2012 | Suzuki et al. | |
| 8,277,962 B2* | 10/2012 | Zhou | G11B 5/667 360/135 |
| 8,298,609 B1 | 10/2012 | Liew et al. | |
| 8,298,689 B2 | 10/2012 | Sonobe et al. | |
| 8,309,239 B2 | 11/2012 | Umezawa et al. | |
| 8,316,668 B1 | 11/2012 | Chan et al. | |
| 8,331,056 B2 | 12/2012 | O'Dell | |
| 8,354,618 B1 | 1/2013 | Chen et al. | |
| 8,367,228 B2 | 2/2013 | Sonobe et al. | |
| 8,383,209 B2 | 2/2013 | Ayama | |
| 8,394,243 B1 | 3/2013 | Jung et al. | |
| 8,397,751 B1 | 3/2013 | Chan et al. | |
| 8,399,809 B1 | 3/2013 | Bourez | |
| 8,402,638 B1 | 3/2013 | Treves et al. | |
| 8,404,056 B1 | 3/2013 | Chen et al. | |
| 8,404,369 B2 | 3/2013 | Ruffini et al. | |
| 8,404,370 B2 | 3/2013 | Sato et al. | |
| 8,406,918 B2 | 3/2013 | Tan et al. | |
| 8,414,966 B2 | 4/2013 | Yasumori et al. | |
| 8,425,975 B2 | 4/2013 | Ishiyama | |
| 8,431,257 B2 | 4/2013 | Kim et al. | |
| 8,431,258 B2 | 4/2013 | Onoue et al. | |
| 8,453,315 B2 | 6/2013 | Kajiwara et al. | |
| 8,488,276 B1 | 7/2013 | Jung et al. | |
| 8,491,800 B1 | 7/2013 | Dorsey | |
| 8,492,009 B1 | 7/2013 | Homola et al. | |
| 8,492,011 B2 | 7/2013 | Itoh et al. | |
| 8,496,466 B1 | 7/2013 | Treves et al. | |
| 8,517,364 B1 | 8/2013 | Crumley et al. | |
| 8,517,657 B2 | 8/2013 | Chen et al. | |
| 8,524,052 B1 | 9/2013 | Tan et al. | |
| 8,530,065 B1 | 9/2013 | Chernyshov et al. | |
| 8,546,000 B2 | 10/2013 | Umezawa | |
| 8,551,253 B2 | 10/2013 | Na'Im et al. | |
| 8,551,627 B2 | 10/2013 | Shimada et al. | |
| 8,556,566 B1 | 10/2013 | Suzuki et al. | |
| 8,559,131 B2 | 10/2013 | Masuda et al. | |
| 8,562,748 B1 | 10/2013 | Chen et al. | |
| 8,565,050 B1 | 10/2013 | Bertero et al. | |
| 8,570,844 B1 | 10/2013 | Yuan et al. | |
| 8,580,410 B2 | 11/2013 | Onoue | |
| 8,584,687 B1 | 11/2013 | Chen et al. | |
| 8,591,709 B1 | 11/2013 | Lim et al. | |
| 8,592,061 B2 | 11/2013 | Onoue et al. | |
| 8,596,287 B1 | 12/2013 | Chen et al. | |
| 8,597,723 B1 | 12/2013 | Jung et al. | |
| 8,603,649 B2 | 12/2013 | Onoue | |
| 8,603,650 B2 | 12/2013 | Sonobe et al. | |
| 8,605,388 B2 | 12/2013 | Yasumori et al. | |
| 8,605,555 B1 | 12/2013 | Chernyshov et al. | |
| 8,608,147 B1 | 12/2013 | Yap et al. | |
| 8,609,263 B1 | 12/2013 | Chernyshov et al. | |
| 8,619,381 B2 | 12/2013 | Moser et al. | |
| 8,623,528 B2 | 1/2014 | Umezawa et al. | |
| 8,623,529 B2 | 1/2014 | Suzuki | |
| 8,634,155 B2 | 1/2014 | Yasumori et al. | |
| 8,658,003 B1 | 2/2014 | Bourez | |
| 8,658,292 B1 | 2/2014 | Mallary et al. | |
| 8,665,541 B2 | 3/2014 | Saito | |
| 8,668,953 B1 | 3/2014 | Buechel-Rimmel | |
| 8,674,327 B1 | 3/2014 | Poon et al. | |
| 8,685,214 B1 | 4/2014 | Moh et al. | |
| 8,696,404 B2 | 4/2014 | Sun et al. | |
| 8,711,499 B1 | 4/2014 | Desai et al. | |
| 8,743,666 B1 | 6/2014 | Bertero et al. | |
| 8,758,912 B2 | 6/2014 | Srinivasan et al. | |
| 8,787,124 B1 | 7/2014 | Chernyshov et al. | |
| 8,787,130 B1 | 7/2014 | Yuan et al. | |
| 8,791,391 B2 | 7/2014 | Bourez | |
| 8,795,765 B2 | 8/2014 | Koike et al. | |
| 8,795,790 B2 | 8/2014 | Sonobe et al. | |
| 8,795,857 B2 | 8/2014 | Ayama et al. | |
| 8,800,322 B1 | 8/2014 | Chan et al. | |
| 8,811,129 B1 | 8/2014 | Yuan et al. | |
| 8,817,410 B1 | 8/2014 | Moser et al. | |
| 2002/0028357 A1* | 3/2002 | Shukh | G11B 5/012 428/827 |
| 2002/0060883 A1 | 5/2002 | Suzuki | |
| 2003/0022024 A1 | 1/2003 | Wachenschwanz | |
| 2004/0022387 A1 | 2/2004 | Weikle | |
| 2004/0132301 A1 | 7/2004 | Harper et al. | |
| 2004/0202793 A1 | 10/2004 | Harper et al. | |
| 2004/0202865 A1 | 10/2004 | Homola et al. | |
| 2004/0209123 A1 | 10/2004 | Bajorek et al. | |
| 2004/0209470 A1 | 10/2004 | Bajorek | |
| 2005/0036223 A1 | 2/2005 | Wachenschwanz et al. | |
| 2005/0037237 A1* | 2/2005 | Chen | G11B 5/656 428/828.1 |
| 2005/0142990 A1 | 6/2005 | Homola | |
| 2005/0150862 A1 | 7/2005 | Harper et al. | |
| 2005/0151282 A1 | 7/2005 | Harper et al. | |
| 2005/0151283 A1 | 7/2005 | Bajorek et al. | |
| 2005/0151300 A1 | 7/2005 | Harper et al. | |
| 2005/0155554 A1 | 7/2005 | Saito | |
| 2005/0167867 A1 | 8/2005 | Bajorek et al. | |
| 2005/0263401 A1 | 12/2005 | Olsen et al. | |
| 2006/0147758 A1 | 7/2006 | Jung et al. | |
| 2006/0181697 A1 | 8/2006 | Treves et al. | |
| 2006/0207890 A1 | 9/2006 | Staud | |
| 2007/0070549 A1 | 3/2007 | Suzuki et al. | |
| 2007/0245909 A1 | 10/2007 | Homola | |
| 2008/0075845 A1 | 3/2008 | Sonobe et al. | |
| 2008/0085427 A1* | 4/2008 | Girt | G11B 5/667 428/829 |
| 2008/0093760 A1 | 4/2008 | Harper et al. | |
| 2009/0067092 A1 | 3/2009 | Suwa et al. | |
| 2009/0071822 A1* | 3/2009 | Sawada | C22C 1/0433 204/298.13 |
| 2009/0117408 A1 | 5/2009 | Umezawa et al. | |
| 2009/0136784 A1 | 5/2009 | Suzuki et al. | |
| 2009/0169922 A1 | 7/2009 | Ishiyama | |
| 2009/0191331 A1 | 7/2009 | Umezawa et al. | |
| 2009/0202866 A1 | 8/2009 | Kim et al. | |
| 2009/0311557 A1 | 12/2009 | Onoue et al. | |
| 2010/0143752 A1 | 6/2010 | Ishibashi et al. | |
| 2010/0190035 A1 | 7/2010 | Sonobe et al. | |
| 2010/0196619 A1 | 8/2010 | Ishiyama | |
| 2010/0196740 A1 | 8/2010 | Ayama et al. | |
| 2010/0209601 A1 | 8/2010 | Shimokawa et al. | |
| 2010/0209737 A1 | 8/2010 | Bian et al. | |
| 2010/0215992 A1 | 8/2010 | Horikawa et al. | |
| 2010/0232065 A1 | 9/2010 | Suzuki et al. | |
| 2010/0247965 A1 | 9/2010 | Onoue | |
| 2010/0261039 A1 | 10/2010 | Itoh et al. | |
| 2010/0279151 A1 | 11/2010 | Sakamoto et al. | |
| 2010/0300884 A1 | 12/2010 | Homola et al. | |
| 2010/0304186 A1 | 12/2010 | Shimokawa | |
| 2011/0097603 A1 | 4/2011 | Onoue | |
| 2011/0097604 A1 | 4/2011 | Onoue | |
| 2011/0171495 A1 | 7/2011 | Tachibana et al. | |
| 2011/0206947 A1 | 8/2011 | Tachibana et al. | |
| 2011/0212346 A1 | 9/2011 | Onoue et al. | |
| 2011/0223446 A1 | 9/2011 | Onoue et al. | |
| 2011/0244119 A1 | 10/2011 | Umezawa et al. | |
| 2011/0299194 A1 | 12/2011 | Aniya et al. | |
| 2011/0311841 A1 | 12/2011 | Saito et al. | |
| 2012/0069466 A1 | 3/2012 | Okamoto et al. | |
| 2012/0070692 A1 | 3/2012 | Sato et al. | |
| 2012/0077060 A1 | 3/2012 | Ozawa | |
| 2012/0127599 A1 | 5/2012 | Shimokawa et al. | |
| 2012/0127601 A1 | 5/2012 | Suzuki et al. | |
| 2012/0129009 A1 | 5/2012 | Sato et al. | |
| 2012/0140359 A1 | 6/2012 | Tachibana | |
| 2012/0141833 A1 | 6/2012 | Umezawa et al. | |
| 2012/0141835 A1 | 6/2012 | Sakamoto | |
| 2012/0148875 A1 | 6/2012 | Hamakubo et al. | |
| 2012/0156523 A1 | 6/2012 | Seki et al. | |

(56) References Cited

U.S. PATENT DOCUMENTS

| | | |
|---|---|---|
| 2012/0164488 A1 | 6/2012 | Shin et al. |
| 2012/0170152 A1 | 7/2012 | Sonobe et al. |
| 2012/0171369 A1 | 7/2012 | Koike et al. |
| 2012/0175243 A1 | 7/2012 | Fukuura et al. |
| 2012/0189872 A1 | 7/2012 | Umezawa et al. |
| 2012/0196049 A1 | 8/2012 | Azuma et al. |
| 2012/0207919 A1 | 8/2012 | Sakamoto et al. |
| 2012/0225217 A1 | 9/2012 | Itoh et al. |
| 2012/0251842 A1 | 10/2012 | Yuan et al. |
| 2012/0251846 A1 | 10/2012 | Desai et al. |
| 2012/0276417 A1 | 11/2012 | Shimokawa et al. |
| 2012/0308722 A1 | 12/2012 | Suzuki et al. |
| 2013/0022842 A1* | 1/2013 | Zhou ................. G11B 5/82 428/828 |
| 2013/0040167 A1 | 2/2013 | Alagarsamy et al. |
| 2013/0071694 A1 | 3/2013 | Srinivasan et al. |
| 2013/0128378 A1 | 5/2013 | Yuan et al. |
| 2013/0165029 A1 | 6/2013 | Sun et al. |
| 2013/0175252 A1 | 7/2013 | Bourez |
| 2013/0194901 A1 | 8/2013 | Kanbe et al. |
| 2013/0216865 A1 | 8/2013 | Yasumori et al. |
| 2013/0224067 A1* | 8/2013 | Sawada ................. C22C 19/07 420/439 |
| 2013/0230647 A1 | 9/2013 | Onoue et al. |
| 2013/0314815 A1 | 11/2013 | Yuan et al. |
| 2014/0011054 A1 | 1/2014 | Suzuki |
| 2014/0044992 A1 | 2/2014 | Onoue |
| 2014/0050843 A1 | 2/2014 | Yi et al. |
| 2014/0151360 A1 | 6/2014 | Gregory et al. |
| 2014/0234666 A1 | 8/2014 | Knigge et al. |

OTHER PUBLICATIONS

STN search history, STN database, Apr. 15, 2016.*
English Abstract of WO2012/026405, Atsushi et al., Mar. 2012, p. 1-6.*
Thiele et al., "Perpendicular Magnetic Anisotropy and Magnetic Domain Structure in Sputtered Epitaxial FePT (001) L10 films," Journal of Applied Physicis, vol. 84, No. 10, Nov. 15, 1998, pp. 5686-5692.
Weller et al., "High Ku Materials Approach to 100 Gbits/in2," IEEE Trans. on Magnetics, vol. 36, No. 1, Jan. 2000, pp. 10-15.
Weller et al., "Thermal Effects Limits in Ultrahigh-Density Magnetic Recording," IEEE Trans. of Magnetics, vol. 35, No. 6, Nov. 1999, pp. 4423-4439.

* cited by examiner

| Material | Melting Point (°C) |
|---|---|
| MgO | 2852 |
| W | 3422 |
| Re | 3182 |
| Ta | 3020 |
FIG. 6A
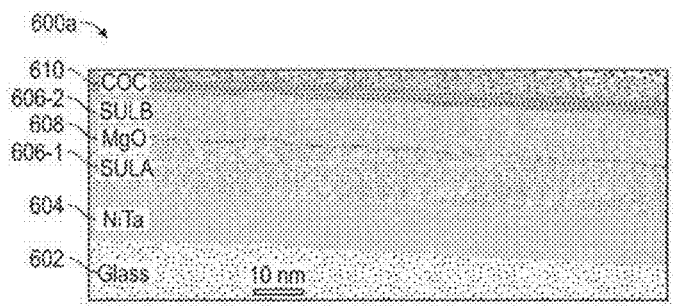
FIG. 6B
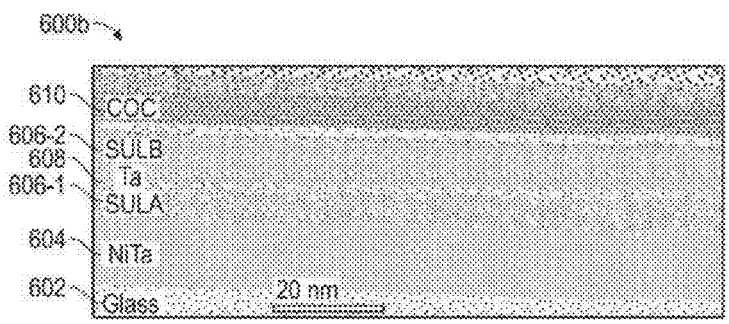
FIG. 6C
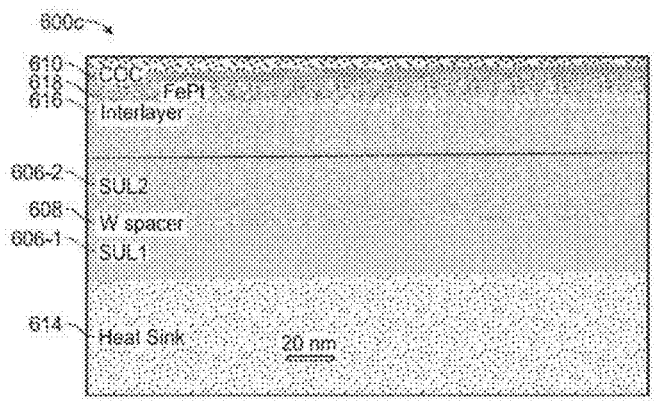
FIG. 6D

SOFT UNDERLAYER FOR HEAT ASSISTED MAGNETIC RECORDING MEDIA

CROSS-REFERENCE TO RELATED APPLICATION

This application claims the benefit of U.S. Provisional Application Ser. No. 61/939,800, filed Feb. 14, 2014, which is incorporated herein by reference in its entirety.

BACKGROUND

For all types of substrates, magnetic recording media has begun to incorporate perpendicular magnetic recording (PMR) technology in an effort to increase areal density. Generally, PMR media may be partitioned into two primary functional regions: a soft underlayer (SUL) and a magnetic recording layer(s) (RL). FIG. 1 illustrates portions of a conventional PMR disk drive system having a recording head 101 including a trailing write pole 102 and a leading return (opposing) pole 103 magnetically coupled to the write pole 102. An electrically conductive magnetizing coil 104 surrounds the yoke of the write pole 102. The bottom of the opposing pole 103 has a surface area greatly exceeding the surface area of the tip of the write pole 102. As the magnetic recording disk 105 is rotated past the recording head 101, current is passed through the coil 104 to create magnetic flux within the write pole 102. The magnetic flux passes from the write pole 102, through the magnetic recording disk 105, and across to the opposing pole 103 to record in the PMR layer 150. The SUL 110 enables the magnetic flux from the trailing write pole 102 to return to the leading opposing pole 103 with low impedance.

With the advent of heat-assisted magnetic recording (HAMR) media, areal density in hard disk drives can be extended beyond 1 Tb/in$^2$. However, superparamagnetic limits, thermal stability, and writability issues can limit the ability to increase areal densities in hard disk drives using conventional PMR media. Thus, and in order to support higher areal densities while also providing thermal stability, HAMR media is often made of magnetic materials or compounds with substantially higher magnetocrystalline anisotropy (indicated by the magnetic anisotropy constant, $K_u$) than that of non-HAMR media (e.g., Cobalt-Chromium-Platinum (CoCrPt) alloys). One example of such an alloy having substantially higher magnetocrystalline anisotropy is the $L1_0$ phase of Iron-Platinum (FePt) alloys. In principle, the higher $K_u$ of $L1_0$ FePt allows grains as small as 2-5 nm to remain thermally stable. Unlike CoCrPt alloys however, the growth of chemically ordered $L1_0$ FePt requires a deposition temperature greater than 400° C. Moreover, due to the limitations in available writing fields, a write assist mechanism, such as HAMR is needed for high $K_u$ media.

Because HAMR media is made of higher-stability magnetic compounds, as described above, it relies upon the application of heat to achieve changes in magnetic orientation. That is, the HAMR media is temporarily heated to reduce its coercivity below that of an applied magnetic write field from a recording head, i.e., the temperature of the recording location on the HAMR media is increased in order to sufficiently lower the location's $K_u$ to allow a change to its magnetic orientation (i.e., record data). This allows for higher media anisotropy and smaller thermally stable grains.

BRIEF DESCRIPTION OF THE DRAWINGS

Various embodiments are illustrated by way of example, and not limitation, in the figures of the accompanying drawings in which:

FIG. 6A is a table of melting point temperatures of various spacer layers utilized in an SUL material in accordance with various embodiments;

FIGS. 6B-6D illustrate representations of TEM micrographs for media structures utilizing various spacer layers in SULs configured in accordance with various embodiments;

DETAILED DESCRIPTION

In the following description, numerous specific details are set forth to provide a thorough understanding of various embodiment of the present disclosure. It will be apparent to one skilled in the art, however, that these specific details need not be employed to practice various embodiments of the present disclosure. In other instances, well known components or methods have not been described in detail to avoid unnecessarily obscuring various embodiments of the present disclosure.

The high deposition temperatures relied upon to obtain high $K_u$ media and elevated temperatures during the writing process (as described above) can pose challenges when developing a SUL structure for HAMR media. Conventional PMR media design may include an amorphous antiparallel coupled SUL (through a thin spacer layer), which provides a closure path for conducting magnetic flux from the write pole to the opposing pole of the recording head.

Figure 1:
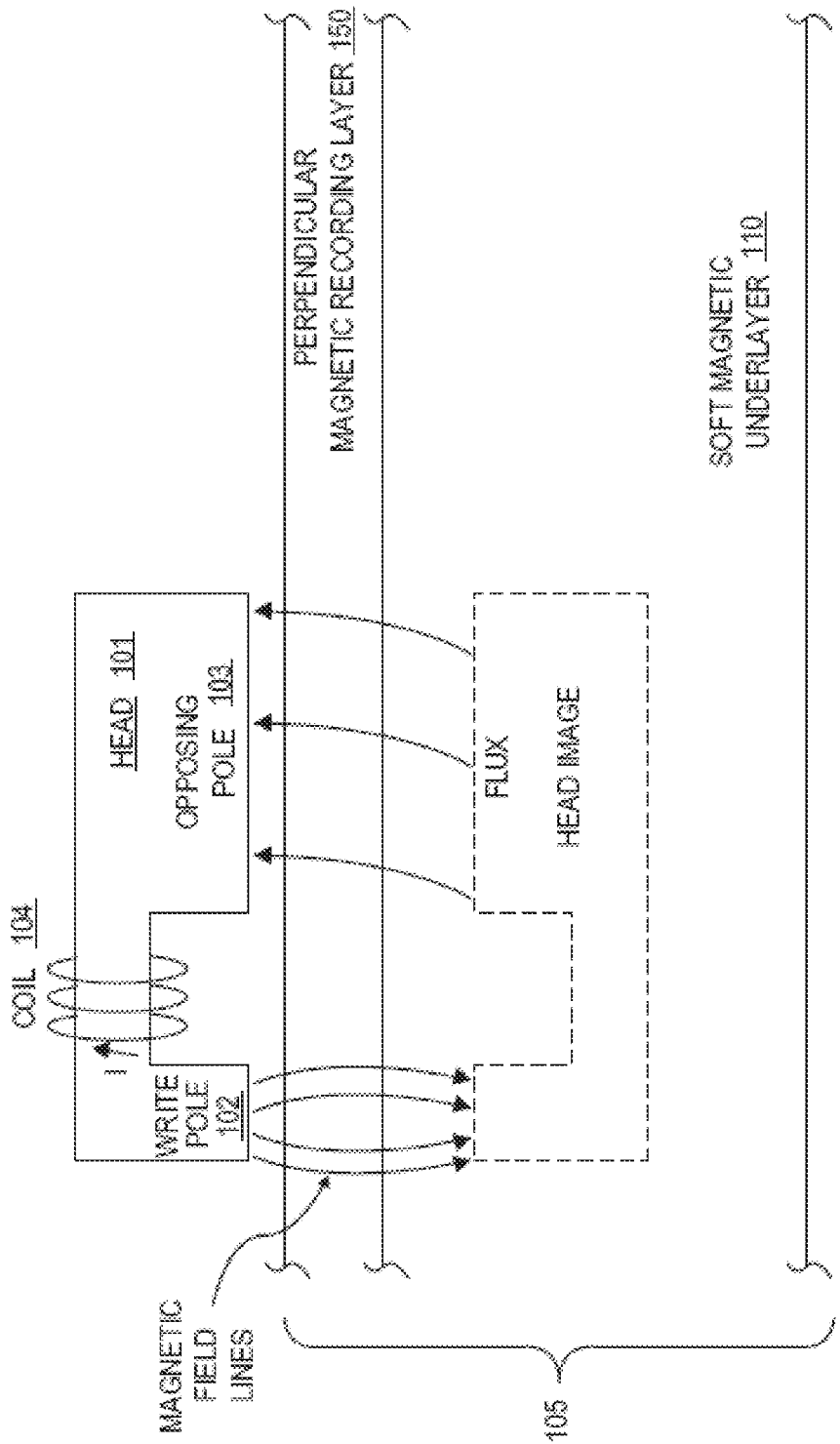
FIG. 1 illustrates an example conventional PMR disk drive system.
Figure 2B:
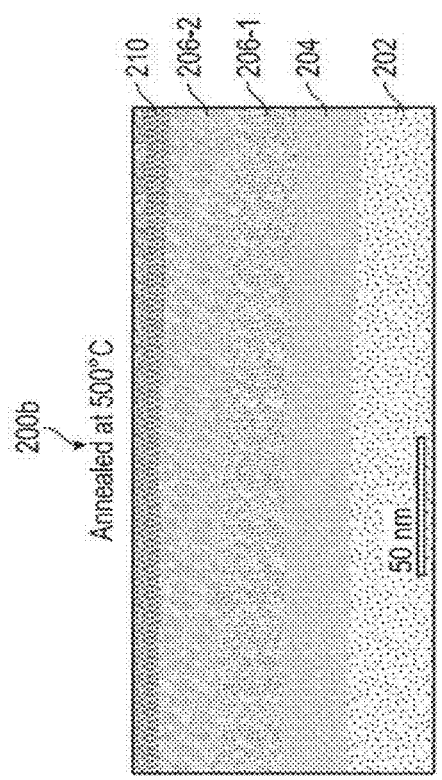
FIG. 2B is a representation of a cross-sectional TEM image of a disk including conventional SULs annealed at 500° C.
Figure 2A:
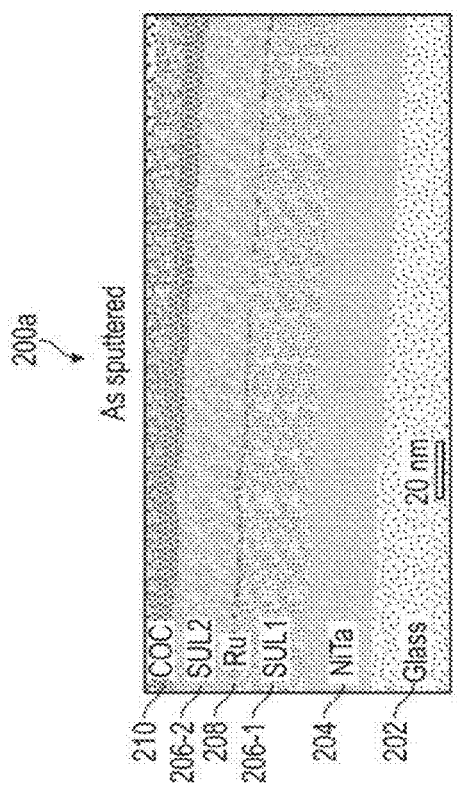
FIG. 2A is a representation of a cross-sectional transmission electron microscopy image (TEM) of an as sputtered disk including conventional SULs.

From a materials perspective alone, once this conventional SUL structure is heated above 500° C., there is a loss in antiparallel coupling due to inter-diffusion of the spacer layer. Additionally, at such higher temperatures, a conventional SUL (which is typically an alloy of Co, Fe, and Tantalum (Ta)) begins to crystallize, resulting in higher roughness for the HAMR media. Both the inter-diffusion and crystallization characteristics of conventional SULs can be detrimental, and play contributing factors to higher noise arising from the conventional SUL, thereby limiting media signal-to-noise ratio (SNR). FIGS. 2A and 2B illustrate an example of this issue of interlayer diffusion and crystallization when a PMR-like SUL stack is annealed at 500° C.

In particular, FIGS. 2A and 2B illustrate representations of cross-sectional TEM images for an as sputtered disk 200a and another similar/identical disk 200b annealed at 500° C., respectively. FIG. 2A illustrates that the as sputtered disk 200a comprises a substrate layer 202, in this instance, a glass substrate, a Nickel-Tantalum (NiTa) adhesion layer 204, a first SUL 206-1 and a second SUL 206-2 with a Ruthenium (Ru) spacer layer 208 therebetween, and a carbon overcoat COC 210. Comparing FIGS. 2A and 2B, it can be seen that Ru spacer layer 208 inter-diffuses after annealing in disk 200b, and essentially disappears into the other layers. Moreover, the presence of crystalline grains is also evident in the annealed structure of disk 200b.

Accordingly, various embodiments are directed to an SUL having certain characteristics that make it compatible with the high temperature requirement (which in the context of HAMR media, may be considered to be temperatures greater than 400° C.) of HAMR media growth, as well as the HAMR writing process. Unlike conventional SULs used in present generation PMR, an SUL in accordance with various embodiments has a high crystallization temperature $T_x$ (in this context, greater than 450° C.), and a high Curie temperature $T_c$ (in this context, greater than 300° C.,). Additionally, an SUL developed in accordance with various embodiments can maintain a saturation magnetization value $B_s$ greater than 9 kGauss at high temperatures. Thus, such an SUL can remain amorphous at temperatures up to, e.g., 650° C., and exhibit a relatively flat integrated noise profile from approximately 300° C. to 650° C. Further still, a spacer layer material is chosen such that inter-diffusion does not occur at these high temperatures.

Figure 3A:
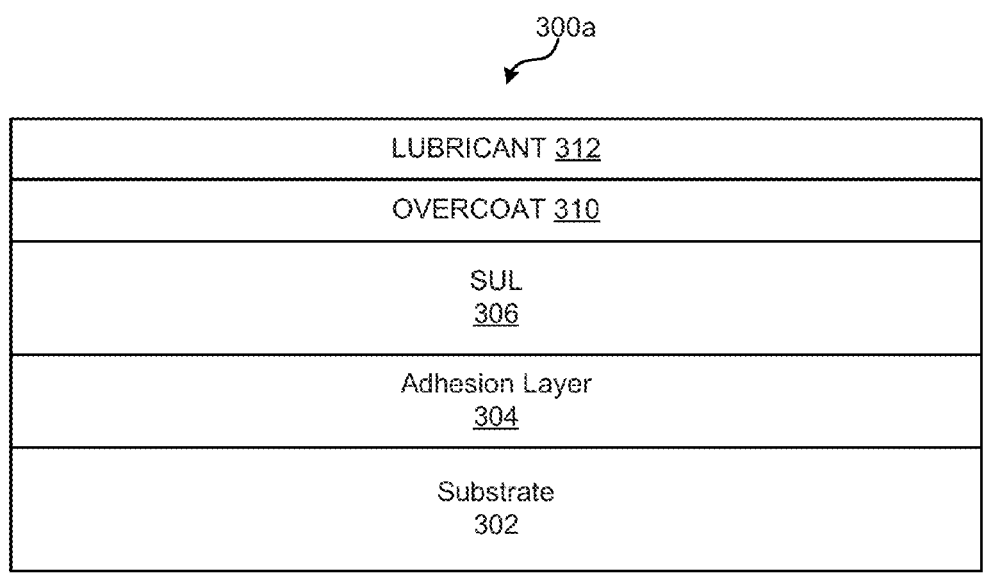
FIG. 3A illustrates a cross-sectional view of an example media structure utilized in evaluating SUL materials in accordance with one embodiment.

To arrive at an SUL that meets the aforementioned criteria, various SUL materials can be evaluated. FIG. 3A illustrates a cross-sectional view of an example media structure 300a utilized in evaluating various SUL materials to determine their suitability for use in HAMR media. Media structure 300a may include a substrate 302, an adhesion layer 304 (30-80 nm thick), a prospective SUL 306 (10-100 nm thick), an overcoat layer 310 (2-4 nm thick), and a lubricant layer 312. Media structure 300a may be post deposition annealed at temperatures ranging from approximately 300-650° C. It should be noted that annealing is described herein as being performed at various temperatures to mimic actual HAMR media deposition conditions.

Figure 3B:
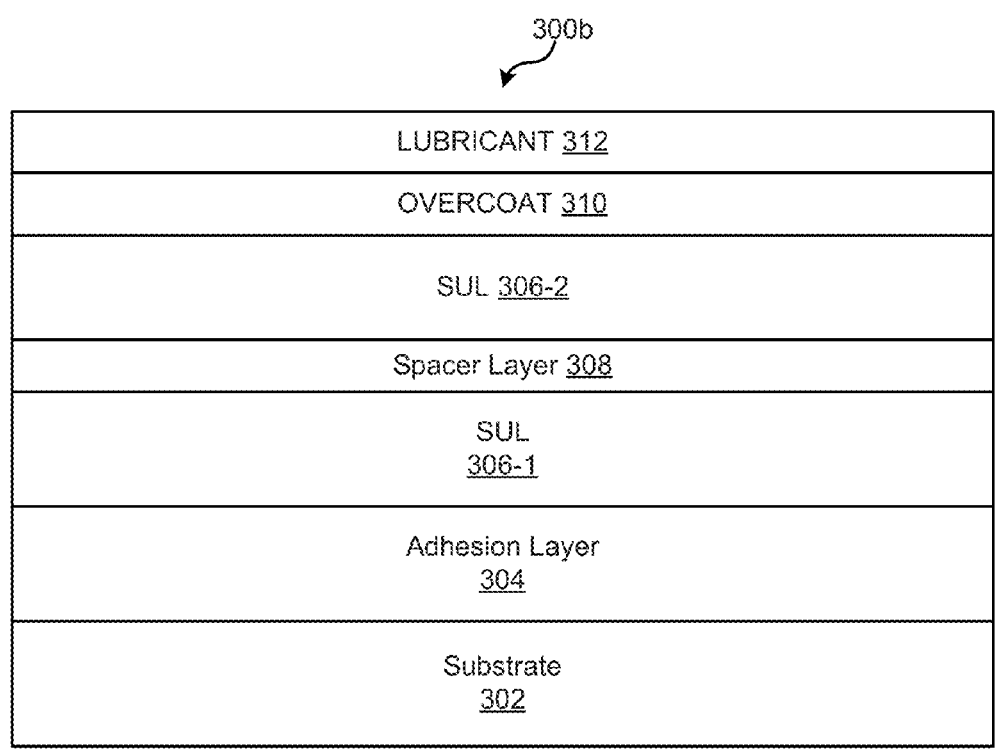
FIG. 3B illustrates a cross sectional view of an example media structure utilized in evaluating SUL materials in accordance with another embodiment.

FIG. 3B illustrates a cross-sectional view of another example media structure 300b that may also be utilized in evaluating various SUL materials to determine their suitability for use in HAMR media. Media structure 300b, similar to media structure 300a, may include a substrate 302, an adhesion layer 304 (30-80 nm thick), an overcoat layer 310 (2-4 nm thick), and lubricant layer 312. In contrast to media structure 300a, however, media structure 300b may include two SULs 306-1 and 306-2 (each 10-50 nm thick), separated by a spacer layer 308 (0-5 nm thick).

Figure 3C:
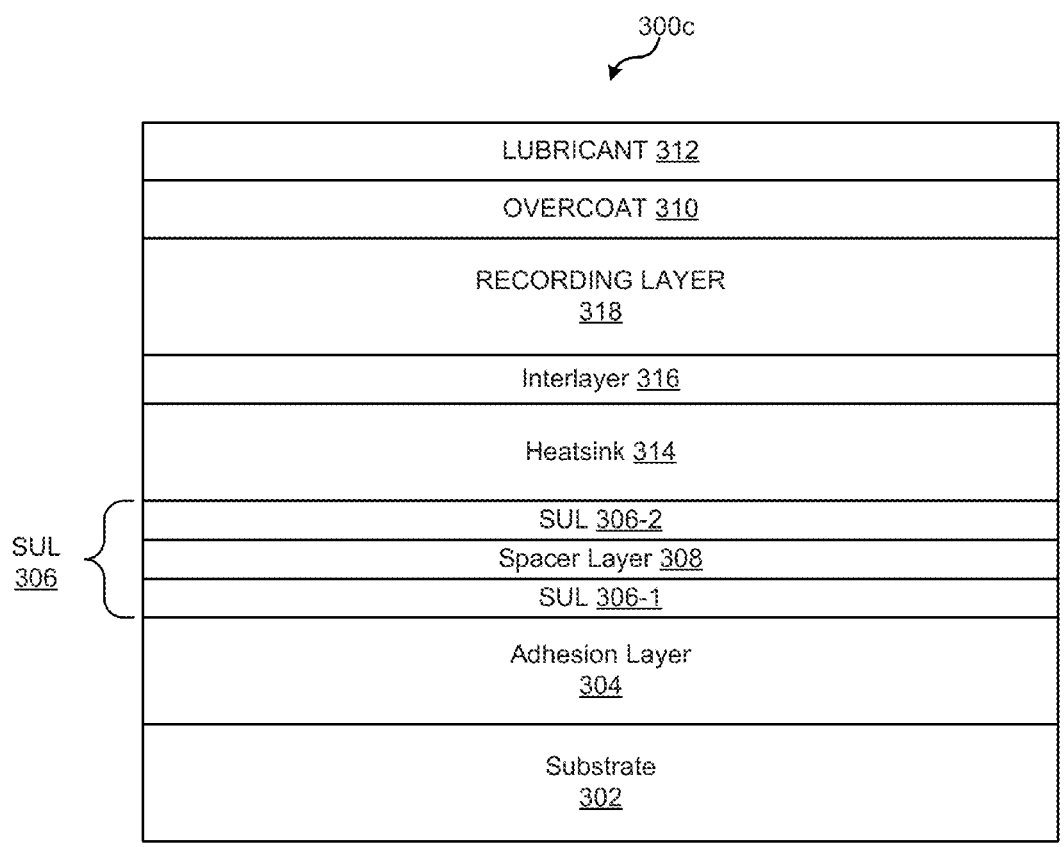
FIG. 3C illustrates a cross sectional view of an example full stack HAMR media structure into which an SUL in accordance with various embodiments is integrated.

FIG. 3C illustrates a full stack HAMR media structure 300c, into which a SUL in accordance with various embodiments can be integrated. HAMR media structure 300c may include a substrate 302. Substrate 302 may be, e.g., a high temperature glass, metal, and/or metal alloy material. In one embodiment, substrate 302 can be disk-shaped or annular. Glass substrates that may be used include, for example, a silica-containing glass such as borosilicate glass and aluminosilicate glass. Metal and metal alloy substrates that may be used include, for example, aluminum (Al), tantalum (Ta), and aluminum magnesium (AlMg) substrates. In an alternative embodiment, other substrate materials such as polymers and ceramics may be used.

HAMR media structure 300c may also include an adhesion layer 304 (30-80 nm thick), which can be, e.g., NiTa, disposed over substrate 302, as well as SUL 306 which in turn may be disposed over adhesion layer 304, and can be made up of first and second SULs 306-1 and 306-2 (each 10-50 nm thick), with a spacer layer 308 (0-5 nm thick) (as previously described with respect to FIG. 3B). The material (s) that make up SUL 306 and spacer layer 308 will be described in greater detail below. It should be noted that SUL 306-1 may be deposited over spacer layer 308, and SUL 306-2 may be deposited over adhesion layer 304 in an alternative embodiment.

Disposed over SUL 306, is a heatsink layer 314 (60-90 nm thick) and an interlayer 316 (5-6 nm thick). Heatsink layer 314 can be configured to specifically facilitate heat transfer for the HAMR media. It should be noted that although the illustrated example embodiment depicts heatsink layer 314 as being disposed between SUL 306 and interlayer 316, it should be appreciated that heatsink layer 314 may alternatively be disposed between the SUL 306 and adhesion layer 304. Generally, regardless of the position within HAMR media structure 300c, heatsink layer 314 is typically a metal or other heat-conductive material. For example, metals or other heat-conductive materials with thermal conductivity greater than 100 $W \cdot m^{-1} \cdot K^{-1}$ may be utilized.

Disposed over interlayer 316, is a recording layer 318 (8-12 nm thick). Recording layer 318 may be, as previously alluded to, an $L1_0$ FePt, FePd, CoPt, or MnAl magnetic recording layer, or a Cobalt Platinum (CoPt) or Cobalt Palladium (CoPd) multilayer alloy having a predetermined/preferred thickness, granular structure, small grain size, desired uniformity, high coercivity, high magnetic flux, and good atomic ordering, as would be appropriate for HAMR media. Other additive elements may be added to the aforementioned alloy recording layer 318 including, e.g., Silver (Ag), Gold (Au), Cu, or Nickel (Ni), or Co. Recording layer 318 may be characterized, for example, in part by a magnetocrystalline anisotropy greater than $1 \times 10^7$ erg/cm$^3$.

Deposition of the various layers described herein may be accomplished via, e.g., sputter deposition techniques, e.g., electroless plating, sputtering (e.g., static or in-line), chemical vapor deposition (CVD), ion-beam deposition (IBD), etc. For example, static sputter systems may be utilized. With in-line sputtering systems, disk substrates are loaded on a pallet that passes through a series of deposition chambers the deposit films successively being deposited on substrates.

Further still, an overcoat layer 310 may be formed on top of recording layer 318 to, e.g., meet tribological requirements, such as contact-start-stop (CSS) performance and corrosion protection. Materials than can be utilized for overcoat layer 310 may be, e.g., carbon-based materials, such as hydrogenated or nitrogenated carbon. A lubricant layer 312 may be placed on top of overcoat layer 310 to further improve tribological performance. Some examples of lubricant that can be used in lubricant layer 312 include, but are not limited to perfluoropolyether, phosphazene lubricant, or a composite thereof.

Figure 4A:
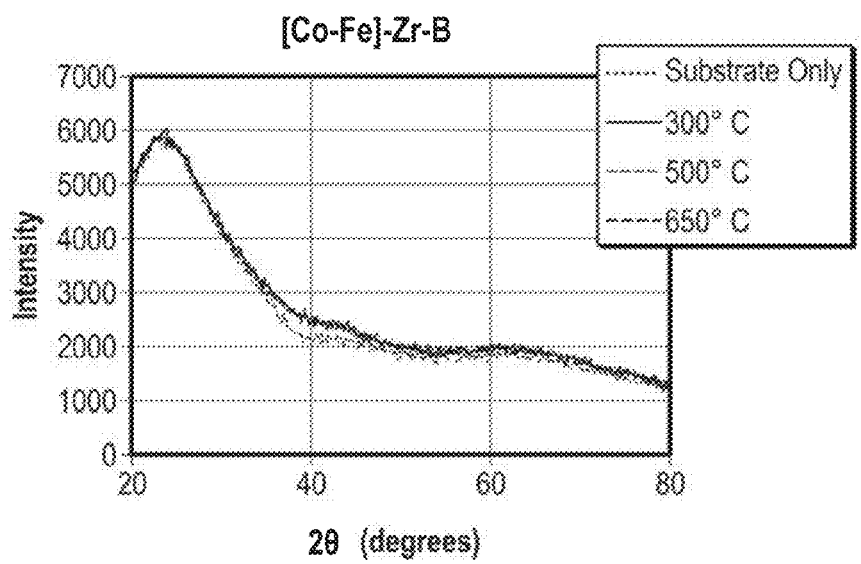
FIG. 4A illustrates X-ray diffraction (XRD) spectra as a function of annealing temperature for an SUL material in accordance with one embodiment.
Figure 4B:
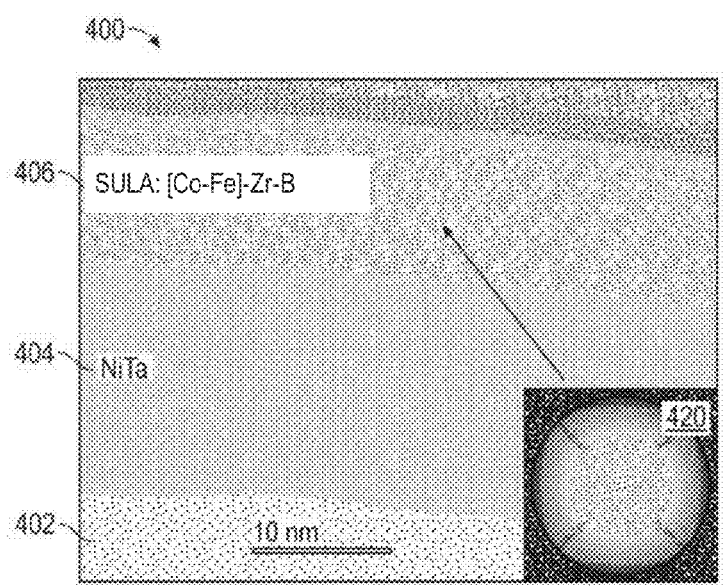
FIG. 4B illustrates a representation of a TEM micrograph of the SUL material of FIG. 4A annealed at 650° C.

FIGS. 4A and 4B illustrate XRD spectra as a function of annealing temperature and a representation of a bright field TEM micrograph for an SUL material annealed at 650° C., respectively. The SUL material in this example embodiment, and others which will be discussed below may have a Bs of 11.3 kGauss, for example, and may be one of a Co or CoFe alloy having at least one additive, the at least one additive comprising Ni, Zirconium (Zr), Boron (B), Ta, Tungsten (W), or Molybdenum (Mo). Such Co or CoFe materials may have also varying compositions due to the amounts of each material(s) included therein, e.g., 20 to 90% Co, 0 to 60% Fe, 0- to 20% Ni, 0 to 20% Zr, 0 to 15% B, 0 to 20% Ta, 0 to 10% W, and 0 to 10% Mo.

FIG. 4A illustrates XRD spectra for a substrate (e.g., substrate 302) only, and a media 400 (illustrated in part in FIG. 4B), with a structure similar to that illustrated in FIG. 3A, having a substrate 402, an NiTa adhesion layer 404, a CoFe-based SUL 406 including additives of Zr and B, an overcoat layer (not shown), and a lubricant layer (not shown), annealed at 300° C., 500° C., and 650° C. As can be appreciated, the XRD spectra of the substrate alone, and media 400 at the three temperatures remain substantially similar/graph on top of each other. This indicates a desired lack of crystallization (which would otherwise appear as peaks), therefore, suggesting that SUL 406 is amorphous at the aforementioned temperatures, including the deposition temperatures utilized in conjunction with HAMR media.

FIG. 4B illustrates a representation of a bright field TEM micrograph for media 400, where it can be seen that SUL 406 remains in an amorphous state when media 400 is annealed at 650° C. FIG. 4B further illustrates this amorphous state of SUL 406 given the lack of appearance of lattice fringes and diffraction contrast (which would otherwise suggest crystalline structure(s)). Inset 420 of FIG. 4B also confirms the amorphous microstructure of SUL 406 given that the fast Fourier transform image (FFT) of SUL 406 includes only diffused rings indicative of the amorphous microstructure.

Figure 5A:
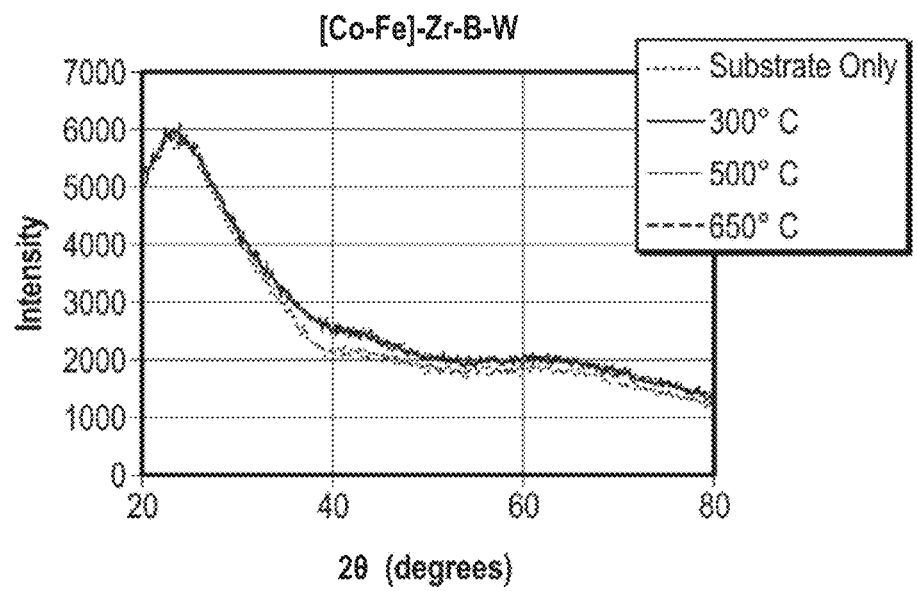
FIG. 5A illustrates XRD spectra as a function of annealing temperature for an SUL material in accordance with another embodiment.
Figure 5B:
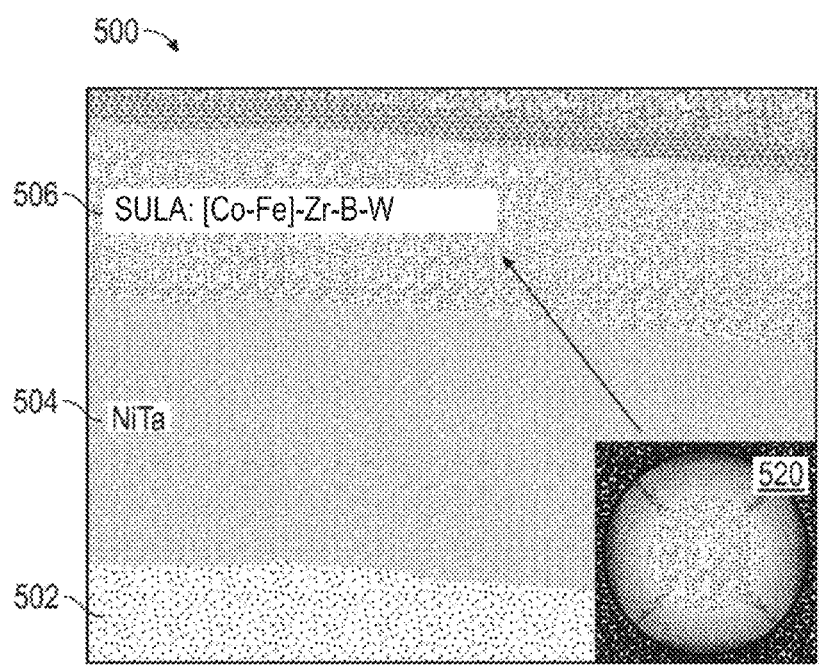
FIG. 5B illustrates a representation of a TEM micrograph of the SUL material of FIG. 5A annealed at 650° C.

FIGS. 5A and 5B illustrate X-ray diffraction (XRD) spectra as a function of annealing temperature and a bright field TEM micrograph for an SUL material annealed at 650° C., respectively. The SUL material in this example embodiment has a composition based on CoFe and additives of Zr, B, and W, and has a Bs=10.6 kGauss.

FIG. 5A illustrates XRD spectra for a substrate (e.g., substrate 302) only, and a media 500 (illustrated in part in FIG. 5B), with a structure similar to that illustrated in FIG. 3A, having a substrate 502, an NiTa adhesion layer 504, SUL 506, an overcoat layer (not shown), and a lubricant layer (not shown), annealed at 300° C., 500° C., and 650° C. As can be appreciated, the XRD spectra of the substrate alone, and media 500 at the three temperatures remain substantially similar/graph on top of each other. This indicates a desired lack of crystallization (as described above with reference to FIG. 4A), therefore, suggesting that SUL 506 is also amorphous at the aforementioned temperatures, including the deposition temperatures utilized in conjunction with HAMR media.

FIG. 5B illustrates a bright field TEM micrograph for media 500, where it can be seen that SUL 506 remains amorphous when media 500 is annealed at 650° C. FIG. 5B additionally illustrates this amorphous state of SUL 506 given the lack of appearance of lattice fringes and diffraction contrast. Inset 520 of FIG. 5B further confirms the amorphous microstructure of SUL 506 because the FFT of CoFe-based SUL 506 includes only diffused rings indicative of the amorphous microstructure.

It should be noted that another SUL alloy in accordance with another embodiment, may have a composition based on a CoFe alloy with Ta and B additives, and may have a Bs=12.3 kGauss, and which exhibits a high $T_x$ (greater than 600° C.). Referring back to FIG. 3C, it should be further noted that any of the aforementioned SUL alloys, whether it be the SUL 406, the SUL 506, or the aforementioned CoFe—Ta—B SUL, may be implemented, in any combination, as SUL 306-1 or SUL 306-2.

It should be further noted that additional SUL layers/stacks may be implemented/incorporated into the media/media structures described herein. That is, there can be multiple laminated SUL stacks, for example, in a single media structure.

As previously discussed, given a media structure like that of media structure 300b illustrated in FIG. 3B, utilizing Ru as spacer layer 308, and annealing at temperatures such as 500° C., can result in inter-diffusion where the Ru spacer layer 308 disappears into other layers. Thus, and in accordance with various embodiments, a spacer layer able to withstand the higher temperatures experienced with HAMR media, is utilized.

FIG. 6A is a table of different materials having a melting point higher than, e.g., 1800° C., that would lend itself to use in HAMR media as a spacer layer between first and second SULs. FIG. 6A indicates that Magnesium Oxide (MgO), Ta, Rhenium (Re), and W, respectively having melting points at 2852° C., 3020° C., 3182° C., and 3422° C., can avoid inter-diffusion in the context of HAMR media, in particular, resistance to the temperatures required for HAMR media growth/processing and writing. In one embodiment, W is utilized as a spacer layer, the flattest microstructure and the highest of the indicated melting points associated with W, wherein a flat microstructure and high melting point are conducive to reducing noise. However, it should be noted that other materials or alloys may be utilized as a spacer layer, including but not limited to the following: Niobium (Nb), Vanadium (V), Mo, Osmium (Os), Carbon (C), Titanium Nitride (TiN), TiC, VN, MoC, TaN, TaC, ZrO2, Yttrium Oxide (Y2O3), or Silicon Dioxide (SiO2).

FIGS. 6B and 6C illustrate representations of TEM micrographs for media 600a and 600b, respectively, each with a glass substrate 602, an NiTa adhesion layer 604, SUL A 606-1, SUL B 606-2, a carbon overcoat layer 610, and a lubricant layer 612. Furthermore, media 600a utilizes an MgO spacer layer 608, while media 600b utilizes a Ta spacer layer 608.

FIG. 6D illustrates a representation of a TEM micrograph for media 600c, respectively, SUL 1 606-1, SUL 2 606-2, a carbon overcoat layer 610, a heatsink layer 614, an interlayer 616, and a recording layer 618. Furthermore, media 600c utilizes a W spacer layer 608.

As can be appreciated from FIGS. 6B-6D, MgO, Ta, and W spacer layers are resistant to inter-diffusion, and show negligible diffraction contrast, indicating that these spacer layer materials have amorphous microstructures even after annealing at high temperatures, e.g., 550° C.

Figure 7:
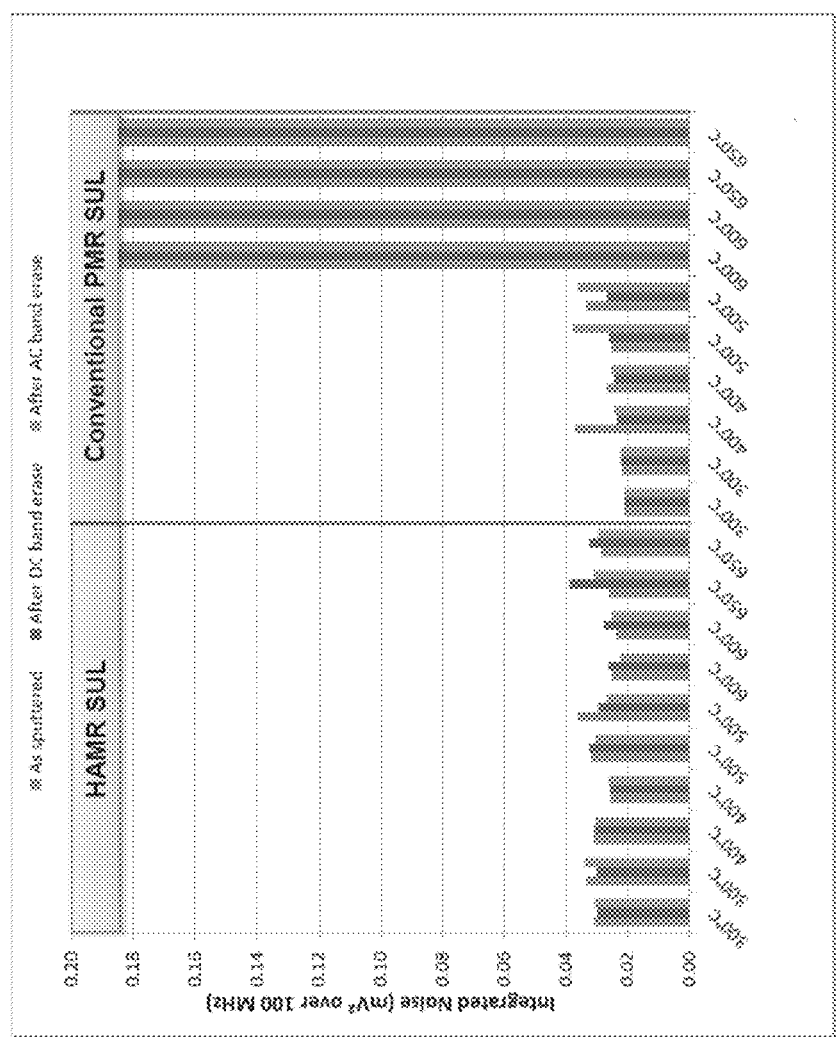
FIG. 7 illustrates an example noise spectra comparison between a conventional SUL and a HAMR SUL configured in accordance with one embodiment.

FIG. 7 illustrates an example noise spectra comparison between a HAMR SUL material, such as those described herein, and a conventional, e.g., Co—Fe—Ta PMR SUL (Co being 20 to 40%, Fe being 40 to 60%, and Ta being 5-20%). As shown in FIG. 7, when a HAMR SUL material is utilized, integrated noise remains relatively low and constant. As previously described, the HAMR SUL material, due its ability to remain amorphous and flat, even at the higher temperatures associated with HAMR media growth and HAMR writing, can avoid contributing to noise. However, with a conventional PMR SUL, FIG. 7A illustrates that upon annealing at temperatures greater than 500° C., noise increases significantly. Accordingly the HAMR SUL materials contemplated in accordance with various embodiments results in noise generation as a result of the HAMR SUL material and HAMR-associated temperatures are independent of each other.

Figure 8:
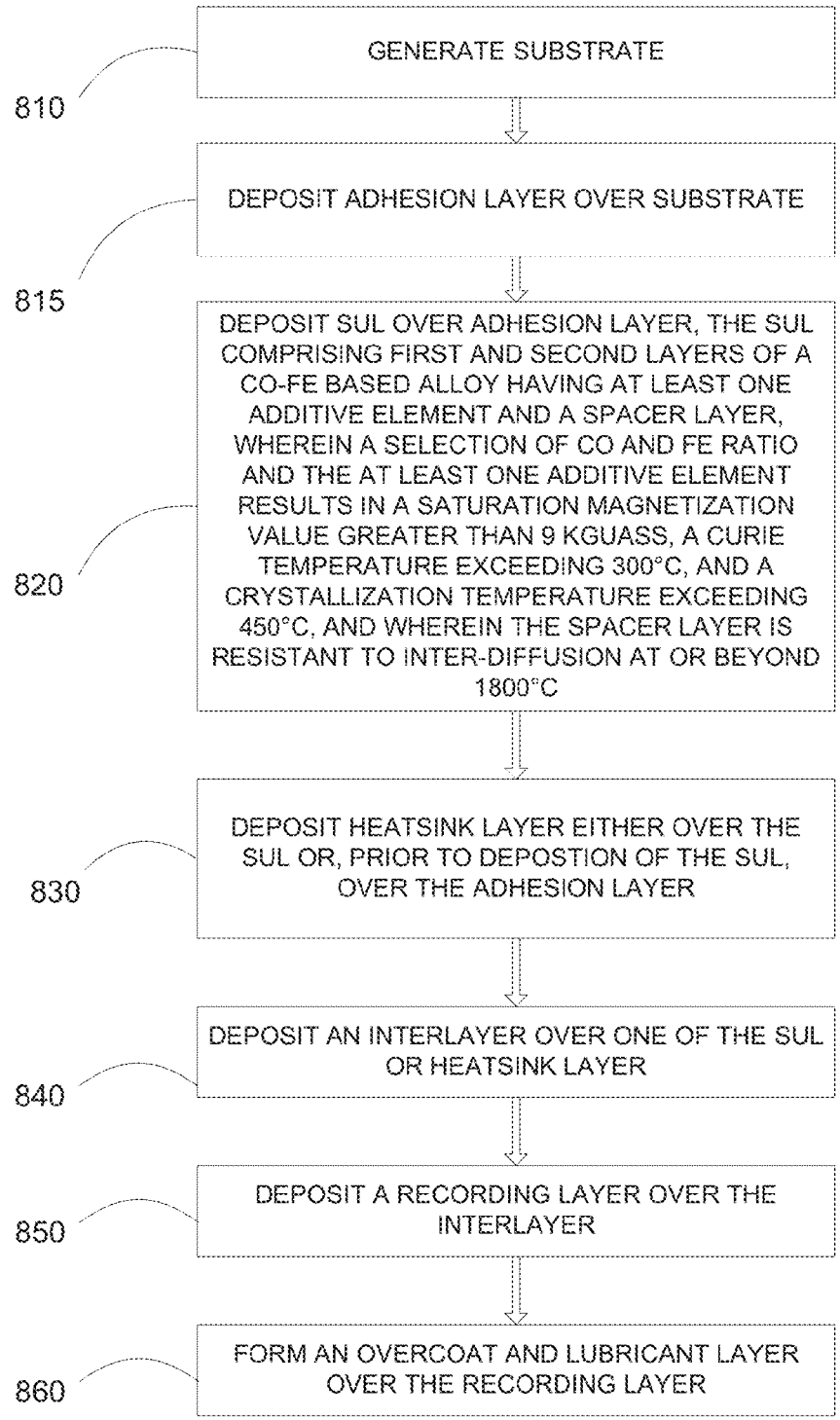
FIG. 8 is a flow chart of example processes performed for manufacturing a HAMR disk utilizing an SUL in accordance with various embodiments.

FIG. 8 is a flow chart illustrating example processes for manufacturing a HAMR disk in accordance with various embodiments. At 810, a substrate is generated or otherwise provided. As previously discussed, the substrate may be a glass substrate. At 815, an adhesion layer is deposited over the substrate. At 820, an SUL is deposited over the adhesion layer. The SUL comprises first and second layers of a Co—Fe based alloy having at least one additive element and a spacer layer. The selection of a Co and Fe ratio and the at least one additive element in a saturation magnetization value greater than 9 kGuass, a Curie temperature exceeding 300° C., and a crystallization temperature exceeding 450° C., and wherein the spacer layer is resistant to inter-diffusion at or beyond 1800° C. The spacer layer is resistant to inter-diffusion at or beyond 1800° C. For example, and as described herein, each of the two layers making up the SUL may be a [CoFe]—ZrB or [CoFe]—ZrBW alloy, while the spacer layer can be one of the following: MgO; Re; W; or Ta. At 830, a heatsink layer is deposited over the SUL, or prior to deposition of the SUL, over the adhesion layer. At 840, an interlayer is deposited over one of the heatsink layer or SUL. At 850 a recording layer is deposited over the interlayer. At 860, an overcoat and lubricant layer are formed over the recording layer.

Figure 9:
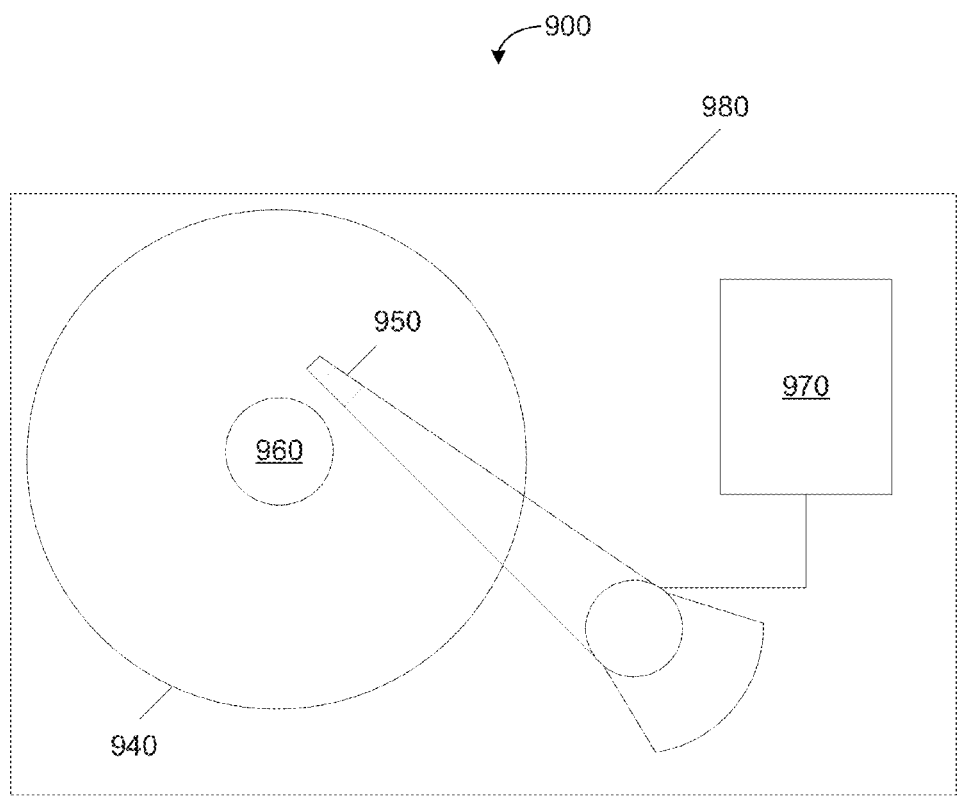
FIG. 9 illustrates an example disk drive in which a HAMR disk utilizing an SUL configured in accordance with various embodiments can be implemented.

FIG. 9 illustrates a disk drive 900 having one or more disks 940. Disk 940 resides on a spindle assembly 960 that is mounted to drive housing 980. Data may be stored along tracks in the magnetic recording layer of disk 940. The reading and writing of data is accomplished with head 950 that has both read and write elements. The write element is used to alter the properties of the perpendicular magnetic recording layer of disk 940. In one embodiment, head 950 may have magneto-resistive (MR), or giant magneto-resistive (GMR) elements. In an alternative embodiment, head 950 may be another type of head, for example, an inductive read/write head or a Hall effect head. In some embodiments, disk 940 has a media structure as depicted in FIG. 3C, and disk drive 900 is a heat assisted magnetic recording (HAMR) drive and incorporate components of a laser source, a waveguide, and a near-field transducer (not shown). Techniques in generating and focusing a laser beam are known in the art, and thus, are not described in particular detail. A spindle motor (not shown) rotates spindle assembly 960 and, thereby, disk 940 to position head 950 at a particular location along a desired disk track. The position of head 950 relative to disk 940 may be controlled by position control circuitry 970.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

The terms "over," "under," "between," and "on" as used herein refer to a relative position of one media layer with respect to other layers. As such, for example, one layer disposed over or under another layer may be directly in contact with the other layer or may have one or more intervening layers. Moreover, one layer disposed between two layers may be directly in contact with the two layers or may have one or more intervening layers. In contrast, a first layer "on" a second layer is in contact with that second layer. Additionally, the relative position of one layer with respect to other layers is provided assuming operations are performed relative to a substrate without consideration of the absolute orientation of the substrate.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:
1. A recording medium, comprising:
   a magnetic recording layer;
   a soft underlayer disposed under the magnetic recording layer, the soft underlayer comprising:
   a first soft underlayer portion formed of a first soft underlayer material comprising a Cobalt-Iron (CoFe) material having a set of additives, the set of additives comprising W; and
   a second soft underlayer portion formed of a second soft underlayer material wherein the second underlayer material is different from the first underlayer material, wherein the first and second soft underlayer materials have Curie temperatures exceeding 300° C. and saturation magnetization values greater than 9 kGauss, and wherein the second soft underlayer material maintains an amorphous microstructure at a temperature greater than 450° C., wherein material composition ranges of the first and second soft underlayer materials comprise 20 to 90% Cobalt (Co), at most 60% Iron (Fe), at most 20% Nickel (Ni), at most 20% Zirconium (Zr), at most 15% Boron (B), at most 20% Tantalum (Ta), at most 10% Tungsten (W), and at most 10% Molybdenum (Mo); and a spacer layer disposed between the first and second soft undeclayer portions, the spacer layer comprising material having inter-diffusion-resistant properties at temperatures greater than 1800° C., wherein the spacer layer is composed of one of Niobium (Nb), Vanadium (V), Mo, Osmium (Os), Carbon (C), Magnesium-Oxide (MgO), W, Rhenium (Re), Titanium Nitride (TiN), TiC, VN, MoC, TaN, TaC, $ZrO_2$, Yttrium Oxide ($Y_2O_3$), Silicon Dioxide ($SiO_2$), or Ta;

an adhesion layer; and a heatsink layer configured to facilitate heat transfer for the recording medium, wherein the soft underlayer and heatsink layer are disposed over the adhesion layer and under the magnetic recording layer.

2. The recording medium of claim 1, further comprising an interlayer disposed over the soft underlayer, an overcoat disposed over the magnetic recording layer, a lubricant disposed over the overcoat, and a substrate disposed under the adhesion layer, wherein the heatsink layer is disposed between the interlayer and soft underlayer.

3. The recording medium of claim 2, wherein the substrate comprises one of a glass substrate, a metal substrate, a metal alloy substrate, a polymer substrate, or a ceramic substrate.

4. The recording medium of claim 1, further comprising an interlayer disposed under the magnetic recording layer and over the soft underlayer, an overcoat disposed over the magnetic recording layer, a lubricant disposed over the overcoat, and a substrate disposed under the adhesion layer, wherein the heatsink layer is disposed between the soft underlayer and adhesion layer.

5. The recording medium of claim 4, wherein the substrate comprises one of a glass substrate, a metal substrate, a metal alloy substrate, a polymer substrate, or a ceramic sub.

6. The recording medium of claim 1 further comprising at least one additional soft underlayer, the at least one additional soft underlayer comprising additional first and second soft underlayer materials between which an additional spacer layer is disposed.

7. The recording medium of claim 1, wherein the spacer layer has a melting temperature greater than 1800° C.

8. The recording medium of claim 1, wherein the set of additives further comprises B and Ta.

9. The recording medium of claim 1, wherein the set of additives further comprises B and Zr.

10. The recording medium of claim 9, wherein the set of additives further comprises Ta.

11. The recording medium of claim 10, wherein the second soft underlayer material comprises Co and Fe.

* * * * *